No. 865,299. PATENTED SEPT. 3, 1907.
J. J. GLEDHILL.
VEHICLE FOR CARRYING BRICK.
APPLICATION FILED APR. 5, 1906.

3 SHEETS—SHEET 1.

No. 865,299. PATENTED SEPT. 3, 1907.
J. J. GLEDHILL.
VEHICLE FOR CARRYING BRICK.
APPLICATION FILED APR. 5, 1906.

3 SHEETS—SHEET 3

Witnesses:
Robert A. Weir
L. V. Domann

Inventor:
John J. Gledhill
By Bulkley & Durand
Attys.

UNITED STATES PATENT OFFICE.

JOHN J. GLEDHILL, OF ST. LOUIS, MISSOURI.

VEHICLE FOR CARRYING BRICK.

No. 865,299.　　　　Specification of Letters Patent.　　　　Patented Sept. 3, 1907.

Application filed April 5, 1906. Serial No. 309,988.

*To all whom it may concern:*

Be it known that I, JOHN J. GLEDHILL, a citizen of the United States of America, and a resident of St. Louis, Missouri, have invented a certain new and useful Improvement in Vehicles for Carrying Brick, of which the following is a specification.

My invention relates to improvements in trucks or vehicles for carrying brick, and more especially to vehicles of that character that are capable of being pushed or moved about by hand, whereby a pallet of brick may be raised from its support and carried to another place, the vehicle embodying in its construction suitable means for raising and lowering that part of the structure upon which the pallet of brick is supported, permitting the vehicle to be positioned below the pallet of brick to be moved, and making it possible to then raise the pallet of brick from its temporary resting place and to then transport and deliver it to a suitable supporting structure, after which the vehicle can be drawn from under the brick thus transported and brought to its new position.

The object of my invention is to provide an improved and highly efficient vehicle or truck of the foregoing general character.

A further object is to provide an elevating truck constructed preferably of metal, with no complicated parts, or parts that are liable to get out of order.

A further object is to provide a cheap and efficient truck and one that is easily operated.

Figure 1:
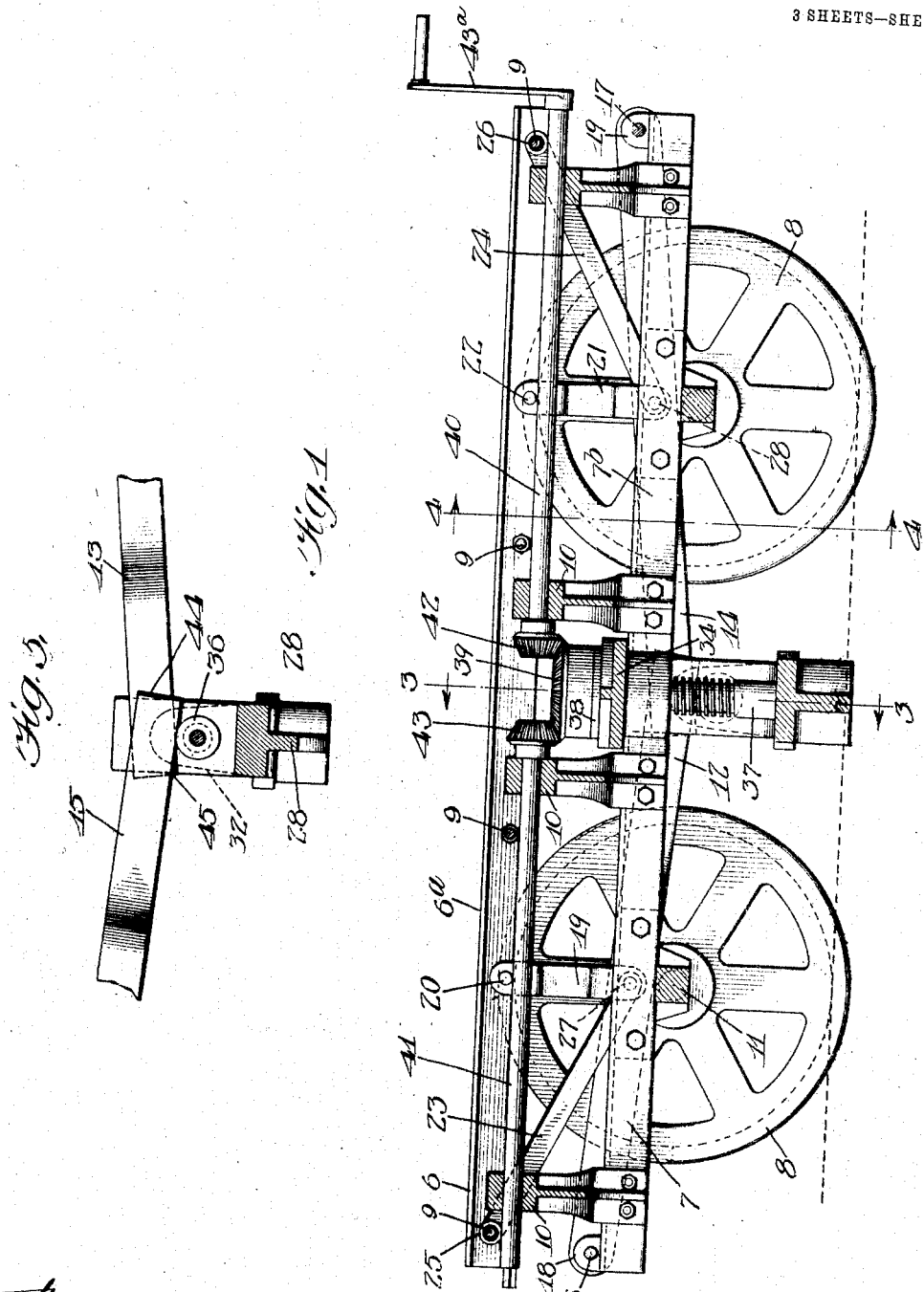
Figure 2:
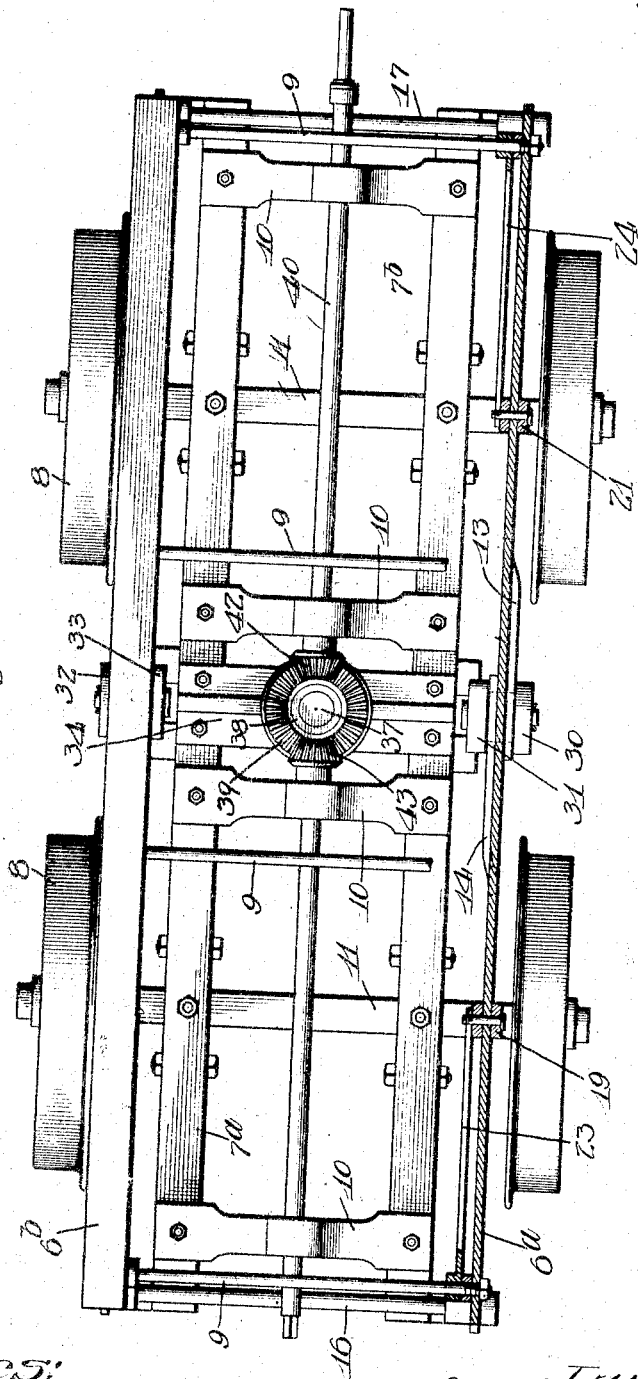
Figure 3:
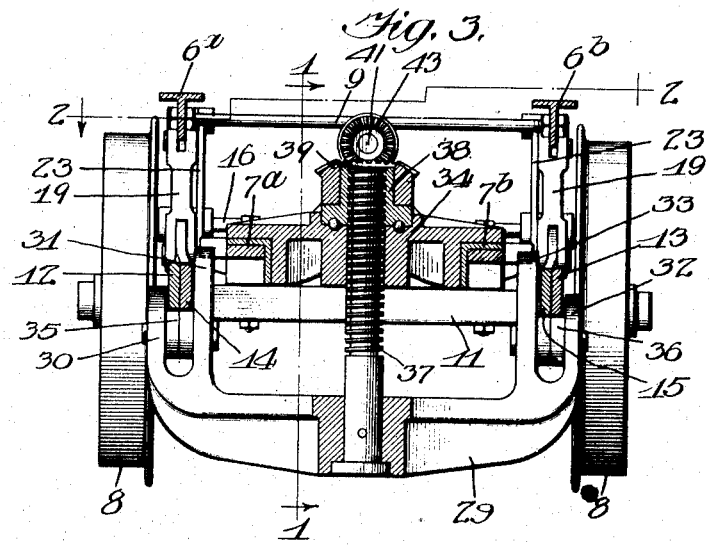
Figure 4:
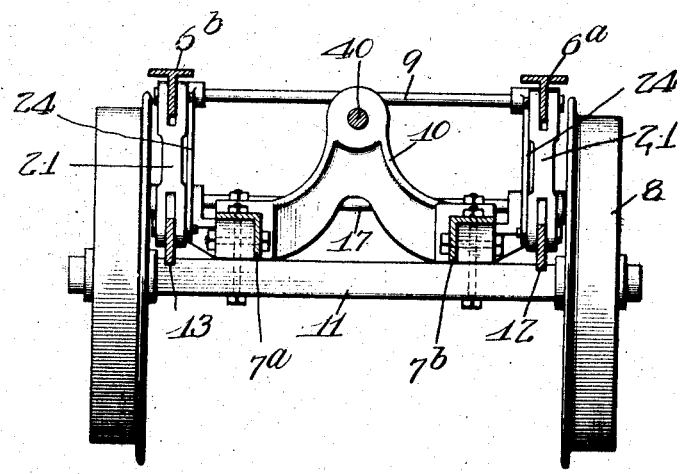

These and such other objects as are hereinafter mentioned are attained by my device, an embodiment of which is illustrated in the accompanying drawings, in which, Figure 1 is a vertical section on line 1—1 of Fig. 3, looking in the direction indicated by the arrows. Fig. 2 is a horizontal sectional view on line 2—2 of Fig. 3, looking in the direction indicated by the arrows. Fig. 3 is a vertical section on line 3—3 of Fig. 1, looking in the direction indicated by the arrows. Fig. 4 is a vertical section on line 4—4 of Fig. 1, looking in the direction indicated by the arrows. Fig. 5 is a sectional detail showing the position of the ends of the lifting levers.

Like figures of reference indicate like parts in the several figures of the drawing.

Referring by numeral to the accompanying drawings, 6 represents the upper frame of the vehicle; 7 represents the lower frame; 8—8 the supporting wheels. The upper frame 6 comprises longitudinal bars $6^a$ and $6^b$ secured together by means of tie rods 9—9. The lower frame consists of longitudinal bars $7^a$ and $7^b$, preferably of angle iron, secured together by means of yokes 10—10 and resting on the axles 11—11. Levers 12 and 13, and 14 and 15, respectively, are pivotally connected to the rods 16 and 17. The rod 16 extends across one end of the frame 7, being seated in openings in the lugs 18 extending upwardly from said frame. The bar 17 is likewise seated in openings in a lug 19 extending upwardly from the other end of the frame 7. The levers 12 and 13 are pivotally secured at a point between the two ends by means of a connecting bar 19 with the upper frame 6 at 20. The levers 14 and 15 are in a like manner connected by the bar 21 to the frame 6 at 22. Slanting bars or rods 23—24 are pivotally connected with the ends of the upper frame 6 at 25 and 26, and pivoted loosely at their other end with the bolts 27, 28, securing the bars 19 and 21 to the levers. A yoke 29 terminating in upwardly forked members 30—31 and 32—33 is secured to the center of the lower frame 7 by means of the casting 34 extending across the frame. Between the forks 30—31 is secured a roller 35, and between the forks 32—33 is secured a roller 36. The free ends of the levers 12 and 14 rest on the roller 35, and the free ends of the levers 13 and 15 rest on the roller 36. Rigidly secured to the yoke 29 and extending upwardly is a double threaded screw 37 extending through the casting 34 and through the threaded bearing 38 journaled on said casting, preferably by means of ball bearings. Surrounding this threaded casting is a beveled nut 39. The tops of the yokes 10—10 provide circular bearings for two shafts 40 and 41. These shafts terminate in angular heads provided with bevel pinions 42 and 43. A removable hand-crank $43^a$ is adapted to fit over the ends of the shafts 40—41, and the inner ends of the shafts terminate in beveled pinions 42 and 43 engaging the beveled nut 39.

The operation of my device is as follows: When it is desired to change the elevation of the upper frame 6 one of the shafts—say 40—is revolved by means of the hand crank 43. The revolution is transmitted through the gearing to the threaded bearing 38. The revolution of this threaded bearing on the casting 34 raises the screw 37, and with it the yoke 29. As the roller bearings 35 and 36 are raised, the free ends 44 and 45 of the levers slide inwardly over the bearings, and are also carried upwardly with the yoke. As the outer ends of the levers are pivotally secured to the ends of the rigid frame, and as the levers are pivotally secured mid-way of their length with the upper frame by means of the bars 19 and 21, the levers in their upward movement carry with them also the upper frame 6. The difference in position of the upper and lower frame may be regulated by varying the height of the screw, and the rate of movement may be regulated by varying the pitch thereof. All of the movements are positive and regular, being of such character as to render it possible to load on the frame pallets of moist brick without the danger of disturbing the piles.

By the use of my device, bricks are handled in large units by few men. The bricks are delivered to the setters without rehandling, retaining their perfect appearance, and the breakage is greatly minimized. The elevating device *per se.* consisting of the double threaded screw and the ball bearing jack, is operated from either end by means of the removable crank 43ᵃ. This renders it unnecessary to provide turn tables, making it possible to operate the vehicle from either end.

My device is peculiarly valuable in transporting loads of green brick to drying sheds or driers, as by its means the bricks themselves are not handled at all, with a consequent minimum loss of material.

It will be noted that all portions of the vehicle are readily accessible from the outside, and there is little liability of disarrangement of the parts.

I claim:

1. In a vehicle of the class described, the combination with a movable supporting frame, of a rigid frame, a yoke secured to said frame, rollers secured thereto, a series of levers secured to said frame and seated on said rollers, and means for actuating said levers.

2. In a vehicle of the class described, the combination with an upper movable frame and a lower rigid frame, of means for changing the elevation of said movable frame, said means comprising a yoke mounted on said rigid frame, rollers mounted on said yoke, screw means for varying the elevation of said yoke, a series of lifting levers pivotally secured to said frames, one end of each of said levers engaging one of said rollers.

3. In a vehicle of the class described, the combination with an upper movable frame and a lower rigid frame, of means for changing the elevation of said movable frame, said means comprising a yoke mounted on said rigid frame, rollers mounted on said yoke, screw means for varying the elevation of said yoke, comprising a screw, crank shaft and connecting gearing, and a series of lifting levers pivotally secured to said frames, one end of each of said levers engaging one of said rollers.

4. In a vehicle of the class described, the combination with an upper movable frame and a lower rigid frame, of means for changing the elevation of said movable frame, said means comprising a yoke mounted on said rigid frame, rollers mounted on said yoke, screw means for varying the elevation of said yoke, comprising a screw, crank shaft and connecting gearing, and a series of lifting levers pivotally secured to said frames, one end of each of said levers engaging one of said rollers.

5. In a vehicle of the class described, the combination with an upper movable frame and a lower rigid frame, of means for changing the elevation of said movable frame, said means comprising a yoke mounted on said rigid frame, rollers mounted on said yoke, screw means for varying the elevation of said yoke, comprising a screw mounted on said yoke, a crank shaft and connecting gearing, and a series of lifting levers pivotally secured to said frames, one end of each of said levers engaging one of said rollers.

6. In a vehicle of the class described, the combination with a rigid frame, a movable frame, a yoke mounted on said rigid frame, rollers mounted on said yoke, lifting levers pivotally secured to said frame and loosely mounted on said rollers, means for operating said lifting levers whereby the elevation of said movable frame is varied, said means comprising a screw seated in said yoke, a threaded bearing secured to said rigid frame, a crank shaft, and gearing connecting said crank shaft and screw.

Signed by me at St. Louis, Missouri, this second day of April 1906.

JOHN J. GLEDHILL.

Witnesses:
 E. L. HESS,
 WALTER C. HOPPIE.